United States Patent [19]
Hopper

[11] 3,981,753
[45] Sept. 21, 1976

[54] STOP-WELD COMPOSITION AND THE METHOD OF USING IT

[75] Inventor: William H. L. Hopper, Carlisle, Mass.

[73] Assignee: Kennecott Copper Corporation, New York, N.Y.

[22] Filed: June 26, 1970

[21] Appl. No.: 59,859

Related U.S. Application Data

[62] Division of Ser. No. 725,480, April 30, 1968, abandoned.

[52] U.S. Cl. ................................. 148/23; 148/26
[51] Int. Cl.² ......................................... B23K 35/34
[58] Field of Search ............. 75/93, 94, 63, 53, 55, 75/58; 148/22, 23, 26

[56] References Cited
UNITED STATES PATENTS

| | | | |
|---|---|---|---|
| 2,604,393 | 7/1952 | Smalley | 75/93 |
| 2,761,796 | 9/1956 | Wasserman | 148/26 |
| 2,880,126 | 3/1959 | Jordan | 148/23 |
| 2,980,562 | 4/1961 | Matter | 148/23 |
| 3,108,361 | 10/1963 | Neel | 148/127 |
| 3,146,090 | 8/1964 | Kanter | 75/53 |
| 3,484,929 | 12/1969 | Schroeder | 148/26 |
| 3,585,025 | 6/1971 | Obst | 75/58 |

*Primary Examiner*—Peter D. Rosenberg
*Attorney, Agent, or Firm*—Lowell H. McCarter; John L. Sniado

[57] ABSTRACT

A novel stop-weld composition comprises a mixture of a stop-weld material and a compound capable of dissociating into a solid and a gas at temperatures below the melting point of the metal being processed. Sheet metal panels are imprinted with the novel stop-weld composition, rollbonded and heated to a temperature sufficient to dissociate the compound and inflate the metal panels in the imprinted areas.

1 Claim, 6 Drawing Figures

STOP-WELD COMPOSITION AND THE METHOD OF USING IT

This is a division of application Ser. No. 725,480 filed Apr. 30, 1968, now abandoned.

PRIOR ART

The stop-weld materials of the prior art have not always been satisfactory because it was not always possible to predict the extent to which the individual sheets will bond or not bond in those areas to which the stop-weld material has been applied. This apparently resulted from the difficulty of distributing the pattern of stop-weld material on the metal sheet and partial fusing of the stop-weld materials to the metal sheets.

In conventional fabrication of composite sheet metal panels having internal hollow cavities a sheet of metal is imprinted by suitable means with a pattern of stop-weld material corresponding generally to the ultimate design or configuration of hollow cavities desired in the final product. A second sheet of dimensionally equivalent metal is superposed on the first sheet with the layer of stop-weld material sandwiched therebetween and the two sheets are suitably secured together as by spot welding at the corners to prevent relative movement during subsequent processing. A blank consisting of the two sheets and a patterned layer of stop-weld material therebetween may then be heated to a required temperature and subjected to pressure welding operations, such as by roll forging, thereby integrally uniting the individual sheets over those areas not coated with the stop-weld material. During the rolling operation individual sheets are reduced in thickness and elongated in the longitudinal direction of rolling; accordingly, the pattern of stop-weld material is initially applied in foreshortened correspondence to the final elongated pattern in direct proportion to the amount by which the sheets are elongated during pressure of rolling. Following the pressure rolling operation, the unified panel is generally cold rolled to a final gauge and may then be annealed to achieve desired physical properties and to improve the strength of the weld bond. The panel is then subjected to an inflation operation by providing a suitable opening between the two sheets in an area where the stop-weld pattern is extended from its internal portions to the outer edge of the unified panel. A nozzle is inserted into this opening for injection into the unjoined areas of the unified panel with a suitable fluid under pressure. Injection of the fluid pressure continues until all unjoined portions of the panel have been extended to the desired height. In accordance with conventional practice, the panel inflation may be carried out freely, i.e., without external restraint, or the panel may be first inserted between a pair of shaped dies or platens each having cavities formed in a face thereof which corresponds to the elongated pattern of stop weld material and to the desired pattern of internal cavities or passageways.

A disadvantage of conventional stop-weld materials in conventional fabrication techniques is that the stop-weld material often does not function properly, allowing the sheet metal panels to weld or partially weld in undesirable areas. When this happens the panel must be discarded or the fluid pressure increased to such a degree that distortion is likely to occur in portions of the panel where the stop weld material was not applied.

U.S. Pat. No. 3,371,399 describes a method for making a composite sheet product having inflated separations by bonding sheets together with a stop-weld pattern therebetween. The stop-weld pattern contains an oxide so that when the sheets are heated in a reducing atmosphere penetrable through at least one of the sheets the resulting gaseous product produces inflation according to the pattern. This process has two inherent objections. It requires a special reducing atmosphere such as hydrogen or dissociated ammonia gas. Secondly at least one of the sheets of the composite must be penetrable by the reducing atmosphere.

OBJECTS AND SUMMARY

It is the principal object of this invention to provide a novel stop-weld material containing a compound capable of dissociating at elevated temperatures into a solid and a gas. Another object of this invention is to provide a novel process of manufacturing hollow articles such as heat exchangers, metal panels of high rigidity, and the like, of sheet material. Yet another object of this invention is to provide an improved process for making hollow articles by pressure welding or unification of metal component sheets between mill rolls. And still another object of this invention is to provide a method for manufacturing sheet metal panels having internal tubular passageways without the necessity of using hydraulic pressure to form the tubular passageways. A still further object of this invention is to provide, in the manufacture of sheet metal panels from low plasticity metals, the use of a stop-weld material containing a small amount of a chemical compound capable of forming a gaseous thin film interface in the patterned area.

In summary the invention comprises a novel stop-weld material containing any of the prior art stop-weld materials and a metal hydride capable of dissociation by the application of heat. The process comprises imprinting a pattern of stop-weld material containing a metal hydride on a first sheet metal strip, superposing a second sheet metal strip on the first strip, pressure welding or bonding the first and second strips to form a composite strip and inflating in the pattern area by heating the composite strip to dissociate the metal hydride in the stop-weld material.

DESCRIPTION

Any convenient stop-weld or separation material may be employed in the novel stop-weld composition. The function of the separation material is to prevent or at least to permit only a partial or low quality bond as compared to the integral weld achieved by pressure rolling of the two sheets in those areas not coated with the stop-weld or separation material. Among the materials suitable are graphite, a graphite-water glass mixture, other inorganic mixtures such as zinc oxide, kieselguhr or other diatomaceous earths, alumina, flint, talc powder, cork, clays and the like and mixtures thereof with each other and with graphite and water glass or the like. Other stop-weld materials that may be used include sodium chloride, trisodium phosphate, molybdenum disulfide, chalk, quartz, lime etc.

One embodiment of the invention is illustrated in the accompanying drawing of which:

Figure 1:
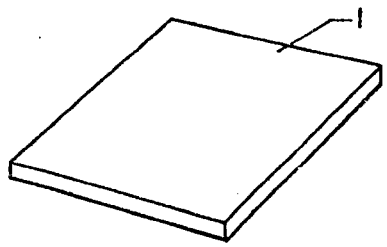
FIG. 1 is a perspective view of a first component sheet without the stop-weld material printed thereon.
Figure 2:
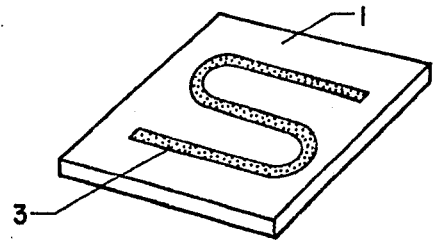
FIG. 2 is a perspective view of the first component sheet having a substantially uninterrupted pattern of stop-weld material printed thereon.
Figure 3:
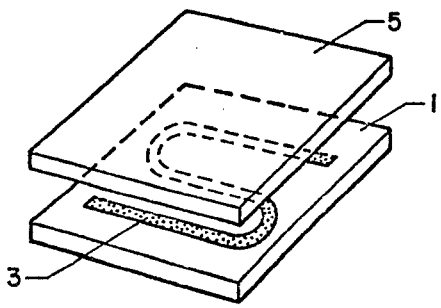
FIG. 3 is a perspective view of the second component sheet being placed on the first component sheet in such a manner that the substantially uninterrupted pattern of stop-weld material is sandwiched between the first and second sheets.
Figure 4:
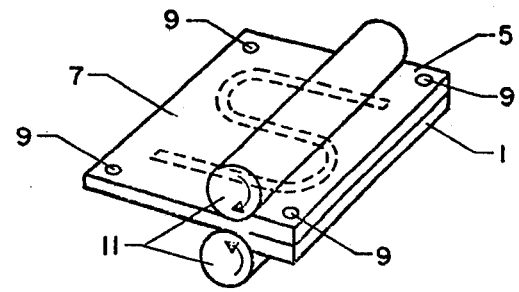
FIG. 4 is a perspective view of the two component sheets being rolled and reduced and showing the spot welding or tacking at the edges to prevent relative movement between the sheets during the pressure bonding process.
Figure 5:
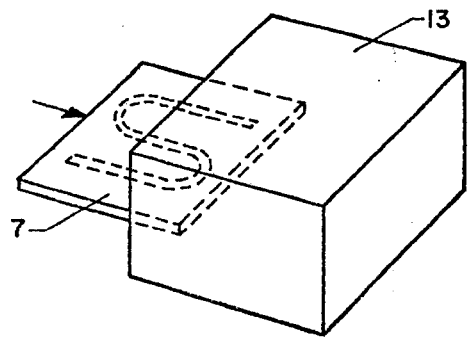
FIG. 5 shows the reduced pressure bonded sheet being fed into a metallurgical furnace.
Figure 6:
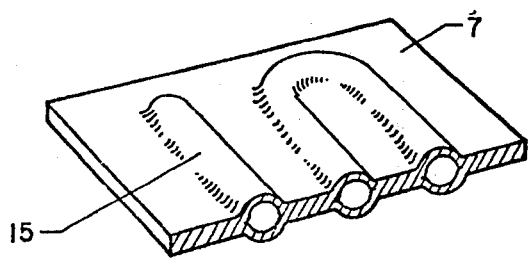
FIG. 6 is a perspective view of the composite sheet inflated in the preselected pattern areas with a portion of the inflated panel having been cut away.

A first component sheet 1 has a substantially uninterrupted pattern of stop-weld material 3 applied thereto in any convenient manner. The stop-weld material 3 may be applied by spraying through a masking die, painting through a stencil roll and printing or squeezing through a silk screen. After the stop-weld material 3 is applied to a first component sheet 1, a second component sheet 5 is positioned adjacent the first component sheet so that the pattern of stop-weld material is interposed between the first and second sheets. The adjacent sheets are then tacked or spot-welded 9 at the corners or along the edges to prevent relative movement between the two sheets. The sandwiched sheets are then pressure bonded such as with rolls 11 to form a blank 7. The blank 7 is then conveyed to a metallurgical furnace or the like 13. In industrial processes it is preferable to pass the composite sheets or blanks 7 through a furnace 13 with a temperature gradient. By passing the blank 7 through a gradient temperature furnace 13 the pressure welded interface is first strengthened by fusion and grain growth across the bonded interface before the dissociation temperature of the metal hydride is reached. As the blank 7 passes through the metallurgical furnace 13 the metal hydride dissociates into gases and inflates in the area of the stop-weld material 3. As the blank 7 emerges from the metallurgical furnace 13 the completely inflated substantially uninterrupted passageways 15 may be observed.

The novel stop-weld composition of this invention comprises any suitable stop-weld material as described above to which has been added from about 1 to about 50 percent by weight of a metal hydride capable of dissociation at metal softening temperatures into a solid and a gas. The metal hydrides suitable for use in the novel stop-weld material include aluminum hydrides, sodium hydrides, potassium hydrides, calcium hydrides, strontium hydrides, barium hydrides, yttrium hydrides, titanium hydrides zirconium hydrides, hafnium hydrides, rare earth hydrides such as lanthanum hydrides, cerium hydrides and gadolinium hydrides, and the actinide hydrides such as thorium hydrides and uranium hydrides. Complex hydrides such as zirconium-nickel hydrides, zirconium-chromium hydrides, zirconium-hafnium hydrides and zirconium-titanium hydrides may also be used. Mixtures of any two or more of the above hydrides may also be used. For economic considerations the preferred metal hydrides are the calcium and titanium hydrides.

As little as 1 weight percent of metal hydride in the novel stop-weld composition is capable of dissociating and inflating the panel or forming a thin film gaseous interface between the panel sheets. Although the metal hydrides may comprise as much as up to 50 weight percent or more of the novel stop-weld material, my experience has shown that for most purposes 25 weight percent metal hydride is sufficient. Therefore, for economic considerations, the preferred range is from about 1 to 25 weight percent metal hydride in the stop-weld material.

The preparation and thermodynamic properties of many of the hydrides described above may be found in George G. Libowitz's book entitled "Solid-State Chemistry of Binary Metal Hydrides," W. A. Benjamin, Inc., 1965.

It is to be understood many of the metal hydrides may have large deviations from their stoichiometric compositions. Therefore the thermodynamic quantities of each hydride do not have fixed values but will vary with changes within the existence range of the non-stoichiometric hydride. It is clear from an examination of the thermodynamic characteristics of the metal hydrides that hydrogen will be given off in substantial quantities before the dissociation temperatures are attained. These facts have a particular advantage with regard to the process of this invention. For example, an examination of the pressure-composition isotherms for a dihydride shows an extended plateau that represents the dissociation pressure. (For a complete discussion of thermodynamics of metal hydrides see chapter 4, pages 50 to 90 of Solid-State Chemistry of Binary Metal Hydrides). Along the plateau the pressure will remain essentially constant as a consequence of the phase rule while the composition of the hydride changes during dissociation. Therefore by the selection of a hydride having a dissociation temperature approaching the softening point of the composite sheet the pressure will remain constant during the inflation of the composite sheet. This assures a constant inflation pressure and prevents large changes in pressure during the dissociation that would cause ruptures or implosions in the inflated areas of the composite sheet. It is possible to work in either the one phase region, i.e., along the isotherm plateau or above the plateau in the two phase region to develop sufficient hydrogen pressures for the purposes of this invention.

Every metal and alloy has a characteristic temperature, usually approaching its melting point, at which its strength is drastically reduced. At this temperature the metal or alloy becomes more or less plastic and is easy to deform. Therefore it is desirable to have a range of gas-producing chemical compounds having dissociation temperatures compatible with the temperature-plasticity properties of the metals or alloys in which it is desired to produce inflated passageways. Table I lists a number of the metal hydrides selected from the list above and their dissociation temperatures. The dissociation temperature is defined as that temperature at which the internal hydrogen pressure reaches one atmosphere. Table I also suggests a number of metals and alloys which exhibit plasticity at temperatures in the range 295°C to 1370°C.

TABLE I

| Hydride System | Dissociation Temperature (°C) | Compatible Metals and Alloys |
|---|---|---|
| YH$_2$ | 1370 | Iron, nickel, steels |

TABLE I-continued

| Hydride System | Dissociation Temperature (°C) | Compatible Metals and Alloys |
|---|---|---|
| CaH$_2$ | 1070 | Nickel |
| ZrH$_2$ | 890 | Copper, beryllium, silver |
| TiH$_2$ | 630 | Aluminum, magnesium |
| UH$_3$ | 430 | Aluminum, magnesium |
| ZrNiH - ZrNiH$_3$ | 295 | Lead, zinc |

It is not to be inferred that this represents a complete list of gas-producing chemical compounds capable of releasing gas when heated. Other hydrides can be found that have dissociation temperatures in almost any range from room temperature to that of YH$_2$ (1370°C). Furthermore, any engineering metal or alloy which can be converted into a moderately plastic condition by heating to a temperature close to its melting point can be internally expanded by the technique described.

The process of this invention comprises applying a continuous substantially uninterrupted layer of the novel stop-weld material in a desired pattern on a clean weldable surface of a first metal component sheet or strip, said stop-weld material containing from about 1 to about 50 percent by weight of a metal hydride capable of dissociating at a temperature below the melting point of the metal sheet or strip, forming a blank by positioning a second metal component sheet or strip so that the pattern of stop-weld material is interposed between said first and second metal component sheets or strips, pressure welding said blank to integrally unify said first and second sheets or strips over the portions not containing the pattern of stop-weld material to form a composite sheet or strip, inflating the composite sheet or strip by subjecting said sheet or strip to a temperature sufficient to at least start the evolution of hydrogen from the metal hydride in the stop-weld material or, if said sheet or strip has low plasticity, heating said sheet or strip at a temperature sufficient to decompose the chemical compound to form a gaseous thin film interface in the patterned area between said first and second sheets or strips and inflating said blank by the injection of fluid pressure in the unjoined area defined by the stop-weld pattern. The pressure welding or roll-bonding process also simultaneously reduces the thickness of the composite sheet. It is to be understood that the inventive process is adaptable to both the batch and continuous method of producing inflated composite products.

Thus it is apparent that this invention has two aspects. First, when the stop-weld material containing the metal hydride capable of dissociation at temperatures below the melting point of a sheet metal component and when the sheet metal component has sufficiently high plasticity at the temperature of dissociation, the internal tubular passageways may be formed by merely passing the composite sheet or strip through a furnace, or by heating the composite sheet or strip between heated platens. The second aspect of this invention, when the composite sheet or strip has low plasticity and is thus not susceptible to the forming of internal tubular passageways below melting temperatures, is that a thin film gaseous interface is formed in the patterned area between the component sheets. The thin film keeps the composite sheets from being partially welded or unified in the patterned areas. In this case the hydraulic pressure injected to form the internal tubular passageways need not be as great as that used in the prior art processes described above.

The novel stop-weld composition of this invention may be applied to the sheet metal component in any suitable manner such as spraying through a masking die, painting through a stencil roll and printing or squeezing through a silk screen.

To prepare the novel stop-weld composition for application to the sheet metal component any suitable stop-weld material such as graphite is mixed with the selected amount of a metal hydride. The graphite and heat decomposable metal hydride should have been previously ground to a colloidal size fineness. The mixture is then dispersed in a volatile liquid such as water, alcohol, ether etc. The amount of liquid used will depend upon the method of application. For example, spraying will require a much thinner consistency than roll printing. After the volatile liquid dispersed stop-weld composition has been applied it is allowed to dry either in ambient air or in a heated enclosure at a temperature sufficient to drive off the volatile liquid but below the temperature at which the metal hydride in the stop-weld material begins to give off hydrogen.

In some cases, such as with aluminum hydride and beryllium hydride, the hydride is never free of the solvent medium in which it is prepared. Consequently the conventional stop-weld materials may be mixed directly with the hydride in the solvent medium.

The process of this invention may be used to make heat exchanger panels such as are used in refrigerators. However articles achieved by the present invention also find considerable utility in the field of architectural or decorative construction panels wherein it is aesthetically desirable to have a pattern of raised or embossed surface configuration which conforms to a predetermined design.

In industrial processes it is preferable to pass the composite sheets through a furnace with a temperature gradient. By passing the composite sheet through a gradient temperature furnace the cold pressure welded interface is strengthened by diffusion and grain growth across the interface before the dissociation temperature of the metal hydride is reached.

The following specific examples are illustrative but not limitative of my invention, it being understood that similar improved results are obtainable with other combinations of different ingredients. All such variations which do not depart from the basic concept of the invention and compositions disclosed are intended to come within the scope of the appended claims.

EXAMPLE 1

Two commercial purity aluminum sheets 4 inches by 4 inches and 0.050 inches thick were cleaned in a hot caustic solution and brightened using a dilute mineral acid. On the surface of one of the aluminum sheets the desired pattern of passageways was imprinted by the silk screen method. The printing medium was a stop-weld composition comprising a mixture of colloidal size graphite and finely ground titanium hydride suspended in a liquid carrying medium of alcohol. On a solids basis the composition was about 90 weight percent graphite and 10 weight percent titanium hydride. The printed pattern was dried to evaporate the alcohol leaving the desired pattern on the aluminum sheet. The second aluminum sheet was then superimposed over the printed sheet so that the imprinted pattern was between the two sheets. The two sheets were sandwiched together by spot welding at the edges to prevent relative movement during the cold pressure bonding process.

The sandwiched aluminum sheets were then cold roll-bonded and simultaneously reduced with a reduction in thickness of about 50 percent to form a sound metallurgical bond by a cold pressure-weld over the portion of the interface between the sheets not occupied by the printed pattern.

The sandwiched structure was heated in a furnace to a temperature of about 550°–600°C for about 10 minutes. Because of the low resistance of the aluminum to plastic deformation at the furnace temperature, the gas pressure generated by the decomposition of the titanium hydride into hydrogen and the lower hydrides of titanium was sufficient to inflate the non-welded envelope and form passageways conforming to the elongated printed pattern.

EXAMPLE II

Following the same general procedure as detailed in Example I a mixture of about 5 weight percent calcium hydride and about 95 weight percent of a stop-weld material consisting of a mixture of 3 parts alumina and 1 part graphite is made and dispersed in alcohol. Two strips of SAE 1006 steel 0.07 inch thick, 10 inches wide are cut from suitable coils of steel. A pattern using the above mixture is printed on the surface of the first strip. The second strip is superimposed and suitably tacked at the corners to prevent relative movement. The unified strips are pressure bonded and reduced to a composite panel 0.048 inch thick representing a 70% reduction. The composite panel is heated in the first zone of a two zone furnace for about 30 minutes at about 750°C to improve the strength of the cold welded bond. In the second zone of the furnace the composite panel is then heated for about 10 minutes at about 1250° to 1300°C to decompose the metal hydride. When the composite panel is removed a slight inflation is apparent in the stop-weld pattern area. This indicates that the gas pressure was insufficient to fully inflate the passageways and that a thin gaseous film interface was formed between the strips of the composite panel. Fluid pressure is then used to fully expand the passageways.

EXAMPLE III

Following the general procedure outlined in the previous examples a coating of stop-weld material containing titanium hydride is applied in a serpentine pattern on the surface of a first sheet of 3004 type aluminum alloy having the approximate dimensions of 24⅝ inches in length, 30¼ inches in width and 0.127 inch in thickness. The stop weld material contains about 25% titanium hydride and about 75% graphite of colloidal size dispersed in an alcohol carrying medium. A second sheet of the aluminum alloy is superposed, tacked at the corners, the sandwich is pressure bonded to the first sheet and simultaneously reduced about 65% to form a composite panel. The composite panel is then placed in zone one of a two zone furnace and heated to about 260°C for about 30 minutes to strengthen the cold pressure weld. The titanium hydride is dissociated by heating the composite panel in the second zone of the furnace at about 550° to 600°C for about 15 minutes. The composite panel is removed from the furnace when the passageways are fully inflated.

Although the invention has been described with reference to certain specific embodiments, materials, and details, various modifications and changes will be apparent to one skilled in the art and the invention is therefore not to be limited to such embodiments, materials or details except as set forth in the appended claims.

What I claim is:

1. A stop-weld composition for pressure inflating internal cavities in sheet metal at elevated temperatures containing from about 1 to 50% by weight of a metal hydride selected from aluminum hydrides, sodium hydrides, potassium hydrides, calcium hydrides, strontium hydrides, barium hydrides, yttrium hydrides, titanium hydrides, zirconium hydrides, hafnium hydrides, rare earth hydrides, actinide hydrides, zirconium-nickel hydrides, zirconium-hafnium hydrides, zirconium-titanium hydrides and mixtures thereof and the balance of the composition a stop-weld material selected from graphite and a graphite-alumina mixture.

\* \* \* \* \*

UNITED STATES PATENT OFFICE
CERTIFICATE OF CORRECTION

Patent No. 3,981,753     Dated September 21, 1976

Inventor(s) William H. L. Hooper

It is certified that error appears in the above-identified patent and that said Letters Patent are hereby corrected as shown below:

On the Title Page, the Inventor"s name should read

-- William H. L. Hooper --.

Title of invention should read -- STOP-WELD COMPOSITION --.

Column 4, Table I, line 67 and Column 5, Table I -continued, line 3, "AHoys" should read -- ...alloys... --.

Signed and Sealed this

Eighteenth Day of January 1977

[SEAL]

Attest:

RUTH C. MASON
*Attesting Officer*

C. MARSHALL DANN
*Commissioner of Patents and Trademarks*